US009202453B2

(12) United States Patent
Pan

(10) Patent No.: US 9,202,453 B2
(45) Date of Patent: Dec. 1, 2015

(54) ASYMMETRIC TEMPERATURE COMPENSATION OF MICROPHONE SENSITIVITY AT AN ACTIVE NOISE REDUCTION SYSTEM

(71) Applicant: Bose Corporation, Framingham, MA (US)

(72) Inventor: Davis Pan, Arlington, MA (US)

(73) Assignee: Bose Corporation, Framingham, MA (US)

( * ) Notice: Subject to any disclaimer, the term of this patent is extended or adjusted under 35 U.S.C. 154(b) by 320 days.

(21) Appl. No.: 13/705,432

(22) Filed: Dec. 5, 2012

(65) Prior Publication Data

US 2014/0153731 A1 Jun. 5, 2014

(51) Int. Cl.

| | |
|---|---|
| ***G10K 11/16*** | (2006.01) |
| ***H04B 15/00*** | (2006.01) |
| ***G10K 11/00*** | (2006.01) |
| ***G10K 11/178*** | (2006.01) |
| ***H04R 3/00*** | (2006.01) |

(52) U.S. Cl.

CPC .......... *G10K 11/002* (2013.01); *G10K 11/1782* (2013.01); *H04R 3/00* (2013.01); *H04R 2410/03* (2013.01)

(58) Field of Classification Search

None

See application file for complete search history.

(56) References Cited

U.S. PATENT DOCUMENTS

| | | | | |
|---|---|---|---|---|
| 4,996,500 | A | 2/1991 | Larson et al. | |
| 5,243,657 | A | 9/1993 | Cotton | |
| 5,689,572 | A * | 11/1997 | Ohki et al. | 381/71.3 |
| 6,625,287 | B1 | 9/2003 | Wurtz | |
| 6,828,563 | B2 | 12/2004 | Ducourant | |
| 7,117,145 | B1 * | 10/2006 | Venkatesh et al. | 704/200 |
| 7,349,547 | B1 | 3/2008 | Isvan | |
| 8,855,329 | B2 * | 10/2014 | Slapak et al. | 381/71.3 |
| 2009/0310811 | A1 | 12/2009 | Inoda et al. | |
| 2011/0080154 | A1 | 4/2011 | Yin et al. | |
| 2011/0216916 | A1 | 9/2011 | Hera et al. | |
| 2012/0230500 | A1 * | 9/2012 | Jasa et al. | 381/55 |
| 2012/0269363 | A1 * | 10/2012 | Suvanto | 381/107 |

OTHER PUBLICATIONS

Zhu, Ronghua, "Active Control of Impulsive Noise", University of Minnesota Duluth, Aug. 2009; 39 pages.

Williams, Jim, "Designs for High Performance Voltage-to-Frequency Converters", Linear Technology, Mar. 1986, Application Note 14; 20 pages.

Ramsden, ED, "In Search of a Low-Cost Temperature Sensor: Part 2", Sensormag.com, Dec. 1, 2005, acessed Sep. 27, 2012; 2 pages.

* cited by examiner

*Primary Examiner* — Andrew L Sniezek

(74) *Attorney, Agent, or Firm* — Schmeiser, Olsen & Watts LLP

(57) ABSTRACT

Provided are a method and apparatus comprising an active noise reduction system. The active noise reduction system comprises an input transducer for transducing acoustic noise to a noise signal. The input transducer has a first sensitivity at a threshold temperature. The active noise reduction system includes circuitry that receives the noise signal and, in response, compensates for an effect by an ambient temperature on a second sensitivity of the input transducer by preventing the second sensitivity from being greater than the first sensitivity in response to a temperature deviation from the threshold temperature.

16 Claims, 4 Drawing Sheets

300

ASYMMETRIC TEMPERATURE COMPENSATION OF MICROPHONE SENSITIVITY AT AN ACTIVE NOISE REDUCTION SYSTEM

BACKGROUND

This specification describes a circuit incorporated in a microphone or related input transducer used by an active noise reduction system and, more particularly, a circuit and method for adjusting a transducer's sensitivity in the presence of an ambient temperature change.

SUMMARY

In one aspect, provided is a component of an active noise reduction system. The active noise reduction system comprises an input transducer for transducing acoustic noise to a noise signal. The input transducer has a first sensitivity at a threshold temperature. The active noise reduction system further comprises circuitry that receives the noise signal and, in response, compensates for an effect by an ambient temperature on a second sensitivity of the input transducer by preventing the second sensitivity from being greater than the first sensitivity in response to a temperature deviation from the threshold temperature.

In another aspect, provided is a sensitivity adjustment circuit, comprising a sensitivity modification device that automatically compensates for an effect by an ambient temperature on a sensitivity of an input transducer by preventing the sensitivity from being greater than a threshold temperature sensitivity in response to a temperature deviation from the threshold temperature.

In another aspect, provided is a method for operating an active noise reduction system, comprising: transducing, at an input transducer, acoustic noise to a noise signal, the input transducer has a first sensitivity at a threshold temperature; and compensating for an effect by an ambient temperature on a second sensitivity of the input transducer by preventing the second sensitivity from being greater than the first sensitivity in response to a temperature deviation from the threshold temperature.

DETAILED DESCRIPTION OF THE EMBODIMENTS

Figure 1:
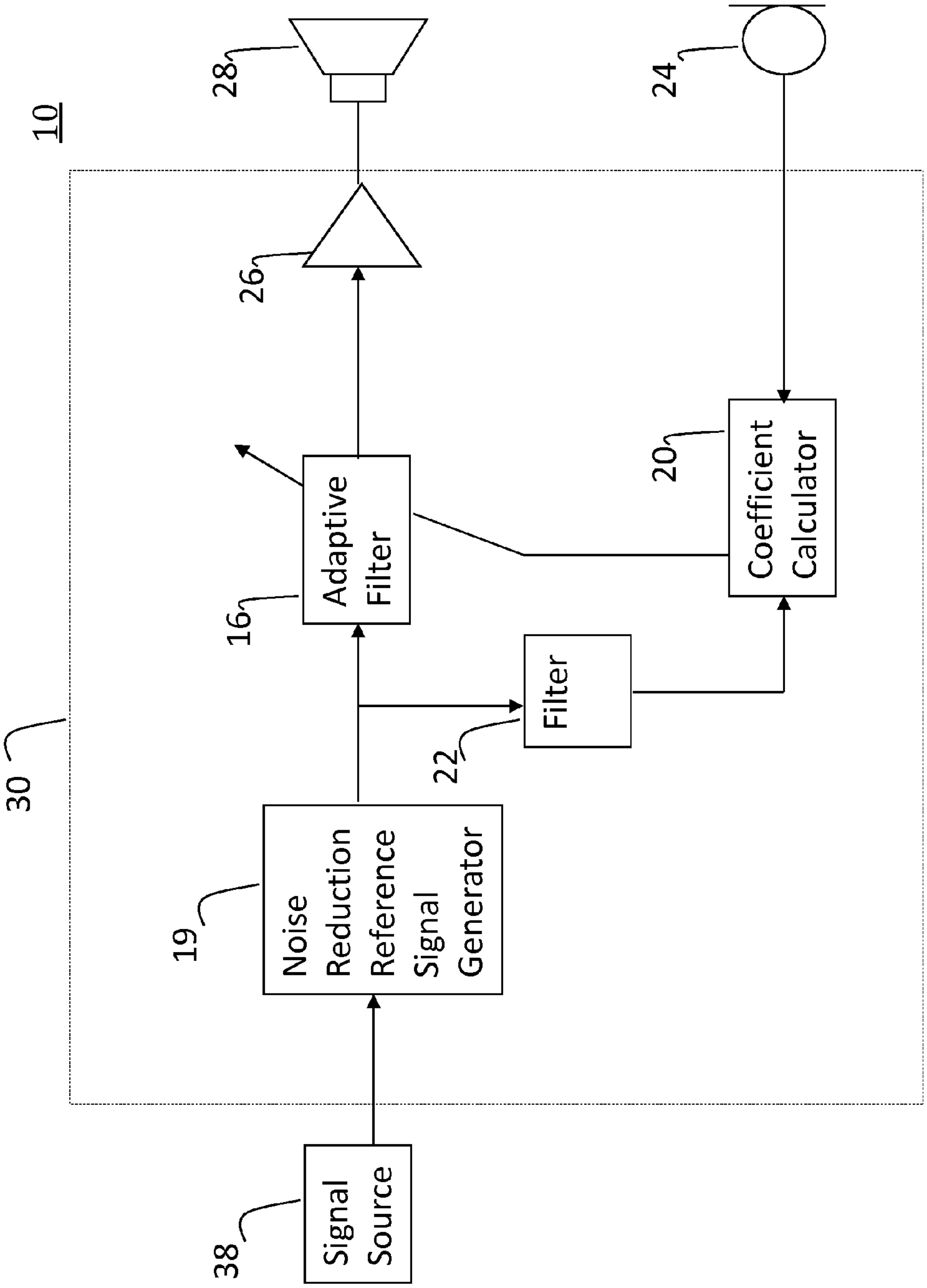
FIG. 1 is a block diagram of an active noise reduction system at which embodiments of the present inventive concepts can be practiced.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Unless otherwise indicated, signal lines may be implemented as discrete analog or digital signal lines. Multiple signal lines may be implemented as one discrete digital signal line with appropriate signal processing to process separate streams of audio signals, or as elements of a wireless communication system. Some of the processing operations may be expressed in terms of the calculation and application of coefficients. The equivalent of calculating and applying coefficients can be performed by other analog or DSP techniques and are included within the scope of this patent application. Unless otherwise indicated, audio signals may be encoded in either digital or analog form; conventional digital-to-analog and analog-to-digital converters may not be shown in circuit diagrams.

This specification describes an active noise reduction system. Active noise reduction systems are typically intended to eliminate undesired noise, i.e., the goal is zero noise. However, in actual noise reduction systems, undesired noise is attenuated but complete noise reduction is not attained. Although a goal of an active noise reduction system is zero noise, it is well-known to those of ordinary skill in the art that an actual result may be significant attenuation, not complete elimination.

FIG. 1 is a block diagram of an active noise reduction system 10 in which embodiments of the present inventive concepts can be practiced. The active noise reduction system 10 can be implemented as an active acoustic noise reduction system in an enclosed space, such as a vehicle cabin, a room, or other enclosed space. In an embodiment, the active noise reduction system 10 is a feed-forward active noise reduction system 10. The system 10 can include elements of an audio entertainment or communications system, which may be associated with the enclosed space. For example, if the enclosed space is a cabin in a vehicle such as a passenger car, van, truck, airplane, and so on, the audio entertainment or communications system may be associated with the vehicle.

A signal source 38, in particular, a noise source such as a vehicle engine, is in communication with a noise reduction reference signal generator 19, for presenting a reference frequency to the noise reduction reference signal generator 19. The noise reduction reference signal generator 19 is in communication with a filter 22 and an adaptive filter 16. A coefficient calculator 20 is coupled between the filter 22, the adaptive filter 16, and at least one input transducer 24 such as a microphone. The adaptive filter 16 is in communication with an output transducer 28, which can include an acoustic driver such as a speaker. The adaptive filter 16 and the coefficient calculator 20 and/or other elements such as an amplifier 26 can modify noise cancellation signals presented to one or more output transducers 28.

Some or all of the noise reduction reference signal generator 19, the adaptive filter 16, the filter 22, and the coefficient calculator 20 may be implemented as software instructions executed by one or more microprocessors or DSP chips. The amplifier 26 and other microprocessors or DSP chips providing features and functions of the active noise reduction system 10 may be components of an amplifier 30.

During operation, a reference frequency, or information from which a reference frequency can be derived, is provided from the signal source 38 to the noise reduction reference signal generator 19. The noise reduction reference signal generator 19 generates a noise reduction signal, or noise cancellation reference signal, which may be in the form of a periodic signal, such as a sinusoid having a frequency component related to a speed of a vehicle engine, to the filter 22 and the adaptive filter 16. The input transducer 24 detects periodic vibrational energy including noise and converts the vibrational energy to a noise signal, sometimes referred to as an "error signal," which is provided to the coefficient calculator 20. The coefficient calculator 20 determines one or more coefficients for the adaptive filter 16 by processing the error signal from the input transducer 24 and the reference signal from the filter 22. The coefficient calculator 20 outputs a resulting coefficient, for example, via a gain adaptation device (not shown), to the adaptive filter 16. The adaptive filter 16 uses coefficients to modify the amplitude and/or the phase of the noise cancellation reference signal received from the noise reduction reference signal generator 19. The adaptive filter 16 provides the modified noise reduction signal to the power amplifier 26, which amplifies the noise reduction signal. The output transducer 28 transduces the noise reduction signal to vibrational energy.

The adaptive filter 16 and the coefficient calculator 20 operate repetitively and recursively to provide a stream of filter coefficients that cause the adaptive filter 16 to modify a signal that, when transduced to periodic vibrational energy, attenuates the target vibrational energy detected by the input transducer 24. The filter 22, which can be characterized by a transfer function, compensates for effects on the energy transduced by input transducer 24 of components of the active noise reduction system, including the power amplifier 26 and the output transducer 28, and of the environment in which the system 10 operates.

The input transducer 24 may be one of many types of devices that transduce vibrational energy to electrically or digitally encoded signals, such as an accelerometer, a microphone, or a piezoelectric device. In embodiments having more than one input transducer 24, the filtered inputs from the transducers 24 are combined in some manner, such as by averaging, or the input from one or more of the filtered inputs may be weighted more heavily than the others before combining. The filter 22, the coefficient calculator 20, and/or other elements not shown but well-known to those of ordinary skill in the art, such as a leakage adjuster, may be implemented as instructions executed by a microprocessor, such as a DSP device. The output transducer 28 can be one of many electromechanical or electroacoustical devices that provide periodic vibrational energy, such as a motor or an acoustic driver.

In operation, at least some of the elements of FIG. 1 can operate to reduce noise in a room, vehicle compartment, or other area, caused by a noise source 38 such as a vehicle engine. An engine speed, which is typically represented as pulses indicative of the rotational speed of the engine, e.g., revolutions per minute (RPM), or other factors that influence noise levels of a cabin interior, can be provided via the signal source 38 to the noise reduction reference signal generator 19, which can determine a reference frequency.

A signal related to the reference frequency is output from the noise reduction reference signal generator 19 to the filter 22. The noise reduction reference signal generator 19 can generate a noise cancellation reference signal, which may be in the form of a periodic signal, such as a sinusoid having a frequency component related to the reference frequency. The noise cancellation signal is provided to the adaptive filter 16 and in parallel to the filter 22. The input transducer 24 transduces acoustic energy, which may include acoustic energy corresponding to entertainment audio signals in a vehicle cabin, room, or the like, to a noise audio signal, which is provided to the coefficient calculator 20. The coefficient calculator 20 can modify the coefficients of the adaptive filter 16. Adaptive filter 16 uses the coefficients to modify the amplitude and/or phase of the noise cancellation signal from the noise reduction reference signal generator 19. The combined effect of some electro-acoustic elements, for example, the output transducer 28, the input transducer 24, and the environment within which the noise reduction system operates, can be characterized by a transfer function, for example, a H(s) transfer function.

The adaptive filter 16, the coefficient calculator 20, and the filter 22 operate repetitively and recursively to provide a stream of filter coefficients that cause the adaptive filter 16 to adjust a signal input thereto. The modification includes adjusting a magnitude and/or phase of specific spectral components of the acoustic signal detected by the input transducer 24 to some desired value. The specific spectral components typically correspond to fixed multiples of the frequency derived from the engine speed or other noise source.

The elements of FIG. 1 may be replicated and used to generate and modify noise reduction signals for more than one frequency. The noise reduction signals for the other frequencies are generated and modified in the same manner as described above.

The adaptive filter 16 and the coefficient calculator 20 alone or together may be implemented as one of a number of filter types, such as an n-tap delay line; a Leguerre filter; a finite impulse response (FIR) filter; and others. The adaptive filter 16 may use one of a number of types of adaptation schemes, such as a least mean squares (LMS) adaptive scheme; a normalized LMS scheme; a block LMS scheme; or a block discrete Fourier transform scheme; and others.

Though shown as a single element, the adaptive filter 16 may include more than one filter element. In some embodiments of the system of FIG. 1, the adaptive filter 16 can include two FIR filter elements, one each for a sine function and a cosine function with both sinusoid inputs at the same frequency, each FIR filter using an LMS adaptive scheme with a single tap, and a single rate which may be related to the audio frequency sampling rate r.

A known issue with noise reduction systems is that phase and magnitude changes in the transfer function of a microphone can affect system performance. It is also known that temperature deviations can affect a microphone's transfer function. Accordingly, an increase or decrease in temperature can result in a corresponding increase or decrease in microphone transfer function in terms of magnitude and phase. Henceforth, the magnitude of a microphone's transfer function response will be referred to as its sensitivity. The asymmetric susceptibility of conventional active noise reduction systems to microphone sensitivity variations can be exacerbated by the effects of temperature variations on microphone sensitivity. For example, when the ambient temperature is below room temperature, a microphone sensitivity can be reduced, resulting in a lessened responsiveness of the adaptive filter 16. On the other hand, an increase in microphone sensitivity due to a rise in temperature can be more detrimental than a decrease in microphone sensitivity, since a sensitivity gain can result in system instability, resulting in noise artifacts or other undesirable effects.

Figure 2:
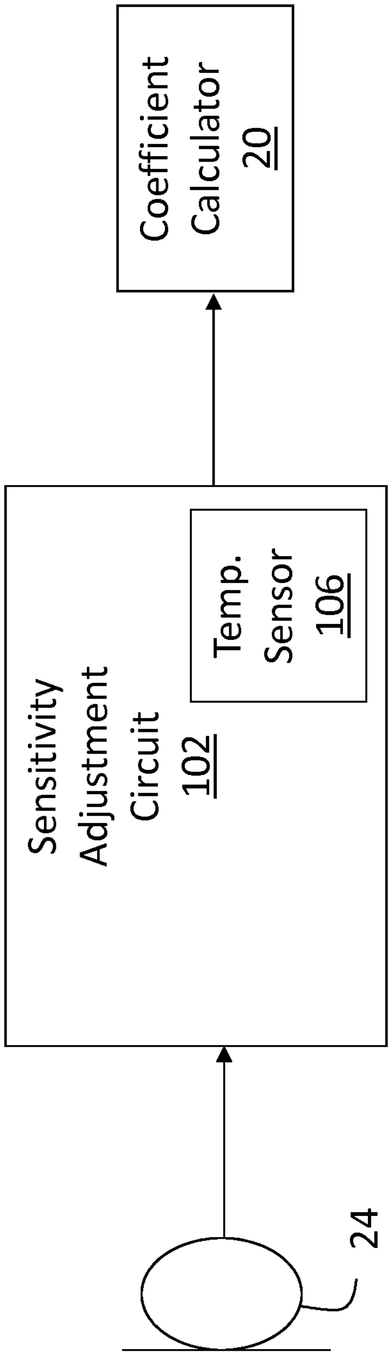
FIG. 2 is a block diagram of a sensitivity adjustment circuit, in accordance with an embodiment.

FIG. 2 is a block diagram of a sensitivity adjustment circuit 102, in accordance with an embodiment. The sensitivity adjustment circuit 102 is intended to mitigate or overcome the effects of temperature on microphone sensitivity, for example, by preventing a microphone sensitivity from exceeding an acceptable threshold sensitivity such as a sensitivity at room temperature. In describing FIG. 2, reference is made to elements of FIG. 1.

The sensitivity adjustment circuit 102 can be coupled between elements of the active noise reduction system 10. For example, the sensitivity adjustment circuit 102 can be coupled between the coefficient calculator 20 and the input transducer 24 of FIG. 1. Some or all of the sensitivity adjustment circuit 102 can be part of, or otherwise integrated with, the input transducer 24. For example, the sensitivity adjustment circuit 102 can be part of a microphone or related input device. Alternatively, some or all of the sensitivity adjustment circuit 102 can be separate from the input transducer 24 and in communication with the input transducer 24. Some or all of the sensitivity adjustment circuit 102 may be implemented as software instructions executed by one or more microprocessors or DSP chips. Some or all of the sensitivity adjustment circuit 102 may be implemented as electronic circuitry.

Figure 4:
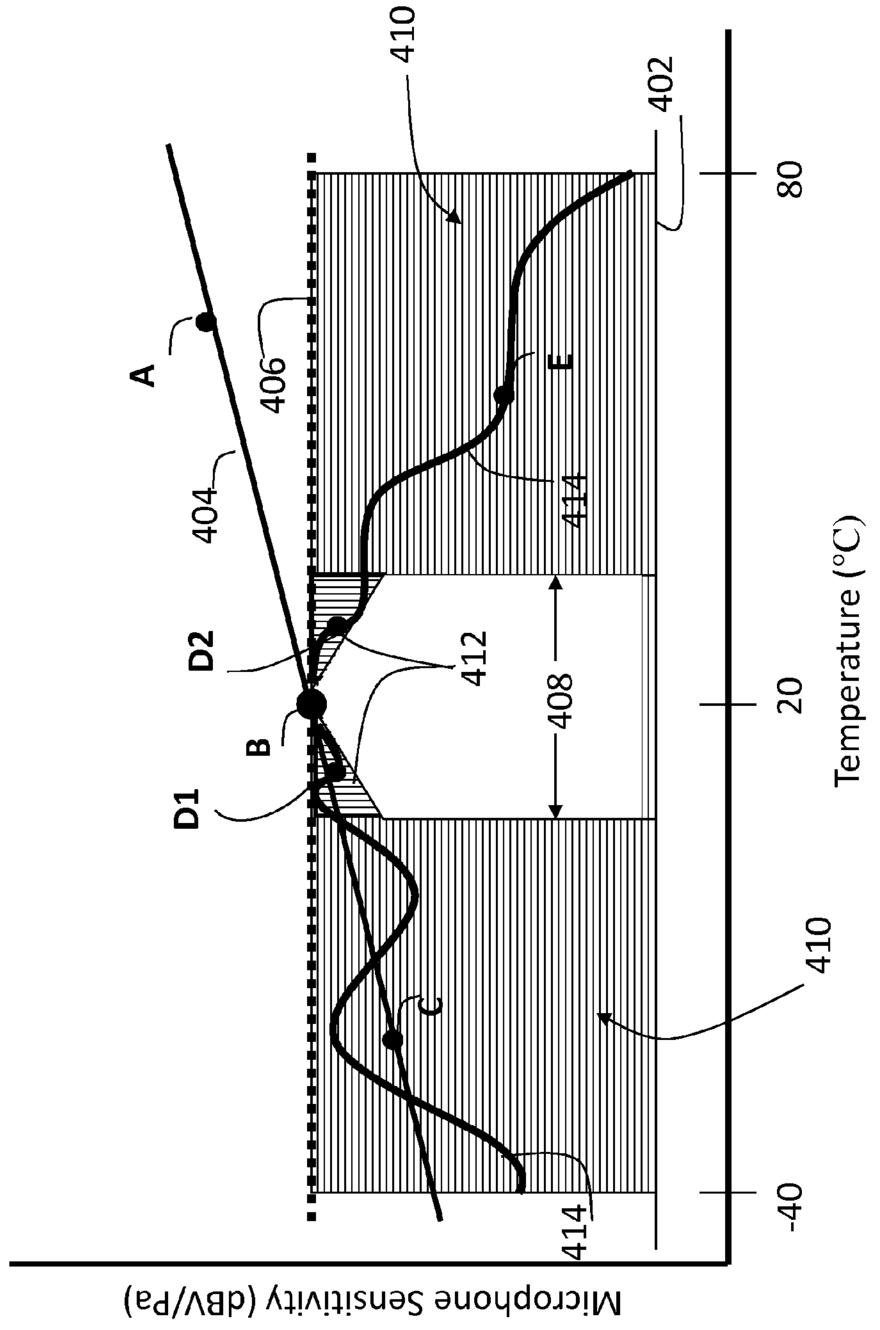
FIG. 4 is a graph that illustrates a comparison between compensated and uncompensated microphone temperature sensitivities, in accordance with an embodiment.

The input transducer 24 can have a minimum acceptable sensitivity, for example, sensitivity 402 shown in the graph of FIG. 4, which is factored into the configuration of the input transducer 24 at a time of manufacture of the input transducer 24. The input transducer receives ambient noise and, in response, outputs a noise signal or related error signal to the sensitivity adjustment circuit 102.

The sensitivity adjustment circuit 102 includes a temperature sensor 106 or related sensitivity modification device that adjusts the microphone sensitivity in the presence of a temperature change, and prevents the microphone sensitivity from increasing at temperatures above a sensitivity level at a threshold temperature such as room temperature. The sensitivity adjustment circuit 102 can also increase a microphone sensitivity to be at or near the sensitivity level at room temperature. This can be achieved without the need for expensive, high precision components, thereby permitting a cost effective circuit to be implemented, for example, non-linear thermistors. In one embodiment, the temperature sensor 106 includes a thermistor or related temperature compensation component. In an embodiment, the thermistor is a positive temperature coefficient (PTC) thermistor having a resistance that changes with an increase in temperature, thereby modifying a voltage related to the microphone sensitivity corresponding to the temperature. If the ambient temperature increases to be greater than room temperature, the thermistor prevents a microphone sensitivity corresponding to the increased temperature from increasing beyond the sensitivity level for room temperature. Referring again to FIG. 1, a noise signal can be provided from the input transducer 24 to the coefficient calculator 20 so that the active noise reduction system 10 functions normally regardless of the presence temperature fluctuations, since temperature compensation is performed to reduce or prevent undesirable microphone sensitivity levels from being achieved.

Figure 3:
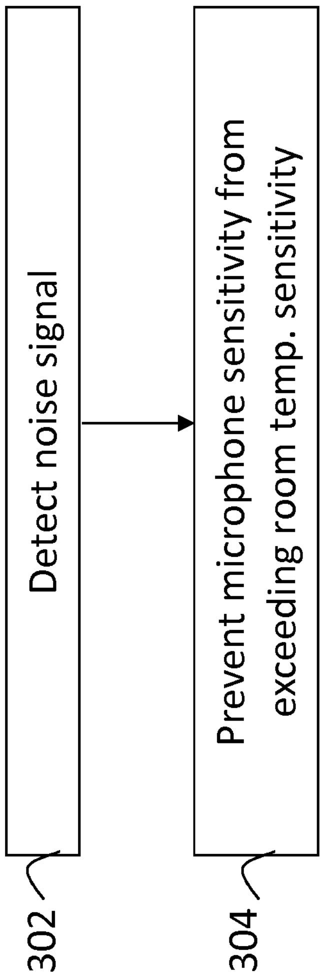
FIG. 3 is a flowchart illustrating a method for adjusting microphone sensitivity, in accordance with an embodiment.

FIG. 3 is a flowchart illustrating a method 300 for adjusting microphone sensitivity, in accordance with an embodiment. In describing the method 300, reference is made to elements of FIGS. 1 and 2. Accordingly, some or all of the method 300 can be performed at the sensitivity adjustment circuit 102 described with respect to FIGS. 1 and 2.

At block 302, a noise signal is detected at a device, for example, the input transducer 24, that converts received acoustic signals into electrical signals As described above, a temperature deviation from a room temperature or other predetermined threshold temperature can occur. The temperature deviation can be the difference between a predetermined threshold temperature, e.g., room temperature, i.e. at or near 20° C., and an upper temperature limit, for example, 50° C., providing a range at which preferred noise cancellation performance is desired. Alternatively, the temperature deviation can be the difference between a predetermined threshold temperature, e.g., room temperature, and a lower temperature limit, for example, −20° C., providing a range at which a preferred noise cancellation performance is desired.

At block 304, temperature compensation can be performed. In an embodiment, a temperature compensation operation is performed in accordance with stringent requirements that the sensitivity is tightly controlled between the threshold temperature and the upper temperature limit and/or the lower temperature limit. Here, the sensitivity can be controlled to be at or very close to the threshold temperature sensitivity, for example, anywhere within the temperature sensitivity regions 412 shown in FIG. 4. In another embodiment, a temperature compensation operation is performed in accordance with less stringent requirements when the temperature deviation occurs outside of the temperature range, for example, at temperature sensitivity E shown in FIG. 4. Here, temperature compensation is performed so that the microphone sensitivity corresponding to the ambient temperature is prevented from exceeding room temperature sensitivity. However, the microphone sensitivity can be adjusted to sensitivity levels that are below the room temperature sensitivity, with no strict requirement that the sensitivity be controlled to be at or very close to the threshold temperature sensitivity.

FIG. 4 is a graph that illustrates a comparison between an uncompensated microphone temperature sensitivity 404 and a compensated microphone temperature sensitivity 414, in accordance with an embodiment for deviations from room temperature.

Microphone temperature sensitivity 402 represents the minimum acceptable microphone sensitivity across one or more frequencies and temperature ranges, for example, a temperature range between −40° C. and 80° C. The minimum acceptable microphone sensitivity 402 is predetermined, for example, according to microphone specifications and other factors known to those of ordinary skill in the art. Uncompensated microphone temperature sensitivity 404 represents a microphone temperature sensitivity across one or more frequencies, and across a temperature range between −40° C. and 80° C. Generally, if the microphone sensitivity, for example, at temperature A, is higher than a microphone sensitivity at temperature B, for example, room temperature (20° C.), then system instability or other undesirable effects can occur due to the microphone sensitivity gain. On the other hand, if a microphone sensitivity at temperature C along the uncompensated microphone temperature sensitivity 404 is lower than a microphone sensitivity at room temperature B, then the system may experience a less drastic effect than that experienced due to a high microphone sensitivity at temperature sensitivity A.

Compensated microphone temperature sensitivity 414 represents a microphone sensitivity that is adjusted by the sensitivity adjustment circuit 102 in the presence of an ambient temperature deviating from room temperature. As shown at an example, acceptable sensitivity curve 414, fluctuations can occur, depending on the characteristics of the temperature compensation device adjusting the sensitivity. Outside of the temperature range 408 described below, acceptable microphone sensitivities can be anywhere within regions 410, shown with horizontal lines, between the minimum acceptable compensated microphone temperature sensitivity 402 and a conventional temperature sensitivity target 406, indicating a wide range of possible sensitivity curves, for example, temperature sensitivity E.

Temperature range 408 represents a temperature range where cancellation performance is desired, for example, between temperatures −20° C. and 50° C. Within the range 408, regions 412, shown with vertical lines, below the ideal compensated temperature sensitivity 406 provide for a range of acceptable temperature-compensated curves at any number of frequencies. Temperature compensation can be performed to tightly control a sensitivity, for example, D1 and/or D2, to be at or near a desirable sensitivity corresponding to a room temperature or other predetermined temperature.

Accordingly, embodiments of the present inventive concepts provide a system that performs temperature compensation to reduce sensitivities above or below room temperature to be preferably at or below the sensitivity target 406. However, as described above, sensitivities at temperatures inside regions 412 may require stringent temperature compensation as compared to temperatures outside temperature range 408. Further, in preferred embodiments, some sensitivity loss at extreme temperatures, for example, less than −20° C. or greater than 50° C., is acceptable, which can provide additional system stability margins for phase and/or sensitivity variations of other system components such as speakers, amplifiers, room acoustics, and so on. Therefore, the liberal requirements imposed outside of the temperature range 408, i.e., less rigid requirements than those inside the temperature range 408, permit microphones or related electronic devices to be implemented with inexpensive temperature compensation components, while addressing the asymmetric susceptibility of an adaptive noise cancellation system to microphone sensitivity variations.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. An apparatus, comprising:

an active noise reduction system, comprising:

an input transducer for transducing acoustic noise to a noise signal, wherein the input transducer has a first sensitivity at a threshold temperature; and circuitry that receives the noise signal and, in response, compensates for an effect by an ambient temperature on a second sensitivity of the input transducer by preventing the second sensitivity from being greater than the first sensitivity in response to a temperature deviation from the threshold temperature, and that adjusts the second sensitivity of the input transducer in the presence of the temperature deviation, wherein the circuitry performs a first temperature compensation operation that rigidly controls the second sensitivity to be at or near the first sensitivity in response to a first temperature deviation between the threshold temperature and an upper temperature limit or a lower temperature limit where a preferred noise cancellation performance is desired, and wherein the circuitry performs a second temperature compensation operation that controls the second sensitivity less rigidly than the first temperature compensation operation in response to a second temperature deviation where the ambient temperature is greater than the upper temperature limit or less than the lower temperature limit.

2. The apparatus of claim 1, wherein the circuitry includes a thermistor.

3. The apparatus of claim 1, wherein the input transducer includes a microphone.

4. The apparatus of claim 1, wherein the active noise reduction system is a feed-forward active noise reduction system.

5. The apparatus of claim 1, wherein sensitivity loss occurs at a temperature greater than the upper temperature limit or less than the lower temperature limit.

6. The apparatus of claim 1, wherein the circuitry automatically compensates for the effect by the ambient temperature on the second sensitivity of the input transducer by controlling the second sensitivity to be substantially the same as the first sensitivity.

7. The apparatus of claim 1, wherein the threshold temperature is at or about 20° C.

8. A sensitivity adjustment circuit, comprising:

a sensitivity modification device that automatically compensates for an effect by an ambient temperature on a sensitivity of an input transducer by preventing the sensitivity from being greater than a threshold temperature sensitivity in response to a temperature deviation from a threshold temperature and adjusting the sensitivity of the input transducer in the presence of the temperature deviation wherein the sensitivity modification device performs a first temperature compensation operation that rigidly controls the sensitivity to be at or near the threshold temperature sensitivity in response to a first temperature deviation between the threshold temperature and an upper temperature limit or a lower temperature limit where a preferred noise cancellation performance is desired, and wherein the sensitivity modification device performs a second temperature compensation operation that controls the sensitivity less rigidly than the first temperature compensation operation in response to a second temperature deviation where the ambient temperature is greater than the upper temperature limit or less than the lower temperature limit.

9. The sensitivity adjustment circuit of claim 8, wherein the sensitivity modification device includes a thermistor.

10. The sensitivity adjustment circuit of claim 8, wherein sensitivity loss occurs at a temperature greater than the upper temperature limit or less than the lower temperature limit.

11. The sensitivity adjustment circuit of claim 8, wherein the threshold temperature is at or about 20° C.

12. The sensitivity adjustment circuit of claim 8, wherein the sensitivity modification device automatically compensates for an effect by the ambient temperature on the sensitivity of the input transducer by controlling the sensitivity to be substantially the same as the threshold temperature sensitivity.

13. A method for operating an active noise reduction system, comprising:

transducing, at an input transducer, acoustic noise to a noise signal, the input transducer has a first sensitivity at a threshold temperature; and compensating for an effect by an ambient temperature on a second sensitivity of the input transducer by preventing the second sensitivity from being greater than the first sensitivity in response to a temperature deviation from the threshold temperature and adjusting the second sensitivity of the input transducer in the presence of the temperature deviation;

performing a first temperature compensation operation that rigidly controls the second sensitivity to be at or near the first sensitivity in response to a first temperature deviation between the threshold temperature and an upper temperature limit or a lower temperature limit where a preferred noise cancellation performance is desired; and performing a second temperature compensation operation that controls the second sensitivity less rigidly than the first temperature compensation operation in response to a second temperature deviation where the ambient temperature is greater than the upper temperature limit or less than the lower temperature limit.

14. The method of claim 13, wherein sensitivity loss occurs at a temperature greater than the upper temperature limit or less than the lower temperature limit.

15. The method of claim 13, further comprising:

automatically compensating for an effect by the ambient temperature on the second sensitivity of the input transducer by controlling the second sensitivity to be substantially the same as the first sensitivity.

16. The method of claim 13, wherein the threshold temperature is at or about 20° C.

* * * * *